Patented Jan. 26, 1932

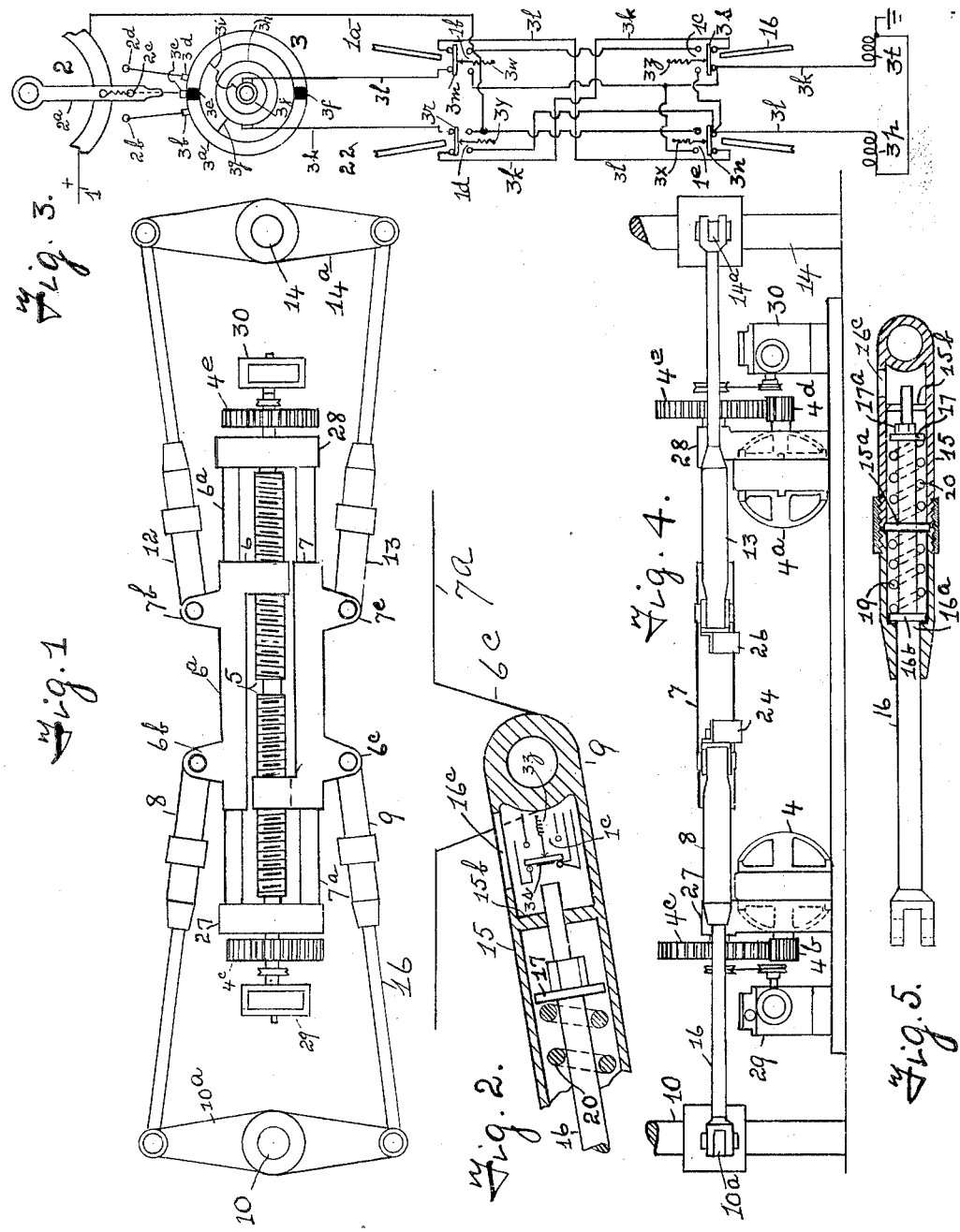

1,842,526

UNITED STATES PATENT OFFICE

ALMON A. JOHNSON, OF SUPERIOR, WISCONSIN

STEERING MACHINE

Application filed October 4, 1930. Serial No. 486,364.

My invention relates to steering machines and has for its objects the provision of a machine for operating the helms or the rudders of ships for steering the same, and for such other purposes as it may serve. One of the subjects of said invention is to provide a machine adapted to be normally operated or reversed by means including a master controller and a follow-up controller, and further adapted to be automatically operated or reversed independently of said controllers when either face of the rudder receives a dangerously violent blow or is subjected to excessive pressure. A further object of my invention is to provide a steering machine adapted to operate a single helm or rudder, or two or more helms or rudders simultaneously. With these and other objects in view, my invention consists of the structures, combinations and arrangements of parts hereinafter described and claimed.

In the drawings, Fig. 1 is a top plan view of a steering gear embodying my said invention. Fig. 2 is an enlarged fragmentary top plan view partly in central horizontal section of a hereinafter described telescopic tiller connecting arm and of an electric circuit closer adapted to be moved by one of the members of said arm. Fig. 3 is a diagrammatic view of a portion of my invention comprising a master controller and a remote follow-up controller and relay coils adapted to be energized through said controllers, including a plurality of circuit closers adapted to be retracted from the controller circuits by corresponding plungers or push rods forming parts of telescopic tiller connecting arms, and a plurality of reversing switches adapted to be closed by said circuit closers when said closers are retracted by said rods. Fig. 4 is a side elevation of a machine embodying my invention, and Fig. 5 is an enlarged detail partly in central horizontal section of one of said tiller connecting arms.

In the drawings, 1 is a lead from any suitable source of electricity (not shown) to a master controller 2 from which the current flows to a follow-up controller 3 and a relay coil $3p$, or $3t$. Said relays are adapted to govern the direction and admission of power fluid or current to engines or motors 4 and $4a$.

The master controller preferably embodies a switch lever or circuit closer $2a$ adapted to be moved into a circuit closing contact with any one or another of any suitable number of contact points as $2b$, $2c$, $2d$, which are connected by electrically parallel conductors with corresponding points, as $3b$, $3c$, and $3d$, respectively, in the follow-up controller. Said follow-up controller preferably embodies an engine or motor operated switch lever or circuit closer of any suitable form or structure as a primary oscillatable ring or wheel $3a$ adapted to contact with the points $3b$, $3c$, and $3d$, and additional points, if any, for similar purposes, which primary ring embodies two conducting segments insulated from each other in any suitable manner and by any suitable means as by blocks $3e$ and $3f$ of insulating material.

One of said conducting segments is electrically connected in any suitable manner as by a wire or brush $3g$ with any suitable conductor, as the concentric ring or hub $3h$. The other of said conducting segments is connected in any suitable manner, as by a wire or brush $3i$ with a second concentric ring or hub $3j$ which is insulated or spaced from the hub $3h$. From either of said hubs, as from the hub $3h$, the current flows through a conductor $3k$, circuit closers $3r$ and $3s$ and relay coil $3t$, and thence directly or indirectly to ground. From the other of said hubs as from the hub $3j$ the current flows through the conductor $3^1$, circuit closers $3m$ and $3n$ and relay coil $3p$ and thence directly or indirectly to ground.

One of said insulating blocks, as $3e$, is adapted to cut any of said points $3b$, $3c$, $3d$, out of circuit when said block comes opposite to said point, and if such point should at the moment be in circuit with said source and with either of said relays to admit power fluid to said engine or motor, said block will open the relay circuit, thereby effecting the discontinuance of the flow of power fluid to said motor or engine unless the circuit through one of said relays be established through a different one of said points or through said independent automatic means.

A normally open detour, shunt, or parallel circuit, excludes said controllers and includes any suitable source of electricity, as the aforesaid source, any suitable conductor or conductors 1 and 1a, a normally open switch 1b adapted to be closed by the circuit closer 3m when said closer 3m is retracted from the controller circuit, and said relay coil 3t.

A second normally open detour, shunt, or parallel circuit excludes said controllers and includes any suitable source of electricity, any suitable conductor or conductors as 1 and 1a, a normally open switch 1c adapted to be closed by said circuit closer 3s when said circuit closer is retracted from the controller circuit, and said coil 3p.

A third normally open detour, shunt, or parallel circuit excludes said controllers and includes any suitable source of electricity, any suitable conductor or conductors, as 1 and 1a, a normally open switch 1d, adapted to be closed by said circuit closer 3r when said closer is retracted from the controller circuit, and said coil 3p.

A fourth normally open detour, shunt, or parallel circuit excludes said controllers and includes any suitable source of electricity, any suitable conductor or conductors, as 1 and 1a, a normally open switch 1e adapted to be closed by said circuit closer 3n when said closer is retracted from the controller circuit, and said coil 3t.

It will be observed that if the current is flowing to one of said coils through said controllers and if one of said circuit closers then in circuit should be retracted by the corresponding push rod to open such circuit, the circuit will be automatically established through one of said parallel circuits either through the same relay coil or through the opposite relay coil, depending upon which circuit closer is retracted from the controller circuit. It will be noted that if the excessive pressure or blow is delivered to the rudder in the same direction in which said rudder is turning, the switching of the current from the controller circuit to the parallel or detour circuit will not reverse the direction of the swing of the rudder, which will already be turning from, or yielding to the blow. If the rudder receives the blow or excessive pressure in the opposite direction from that in which it is turning, the switching of the current from the controller circuit to one of the parallel circuits will cause the reversal of the motor to reverse the swing of the rudder so that it will yield to the blow or excessive pressure.

A special feature of my present invention is that if all circuits are open and the rudder substantially stationary when it receives the blow, the impact of the blow will cause one of the push rods to transfer the proper circuit closer from the controller circuit to the proper parallel circuit through which the current will then flow to the proper relay to admit power fluid to the engine or motor in the direction necessary to cause the machine to swing the rudder so that it will yield to the blow or excessive pressure.

Said circuit closers 3m, 3n, 3r, and 3s are adapted to be normally retained in, and returned to closing position in the respective master and follow-up controller circuits by any suitable yielding means, as springs 3w, 3x, 3y, and 3z, respectively. Said switches and circuit closers may be located at any suitable and convenient points, as within the pivoted ends of the sleeves 16 as indicated diagrammatically in said Fig. 2, and may be moved by said rods through any suitable intermediate means, or they may be moved by said rods directly as indicated in Fig. 2. Handhole as 16c may be provided in the sleeves for leading in switch and circuit wires and for any other construction or repair purpose.

The form of steering machine embodying my invention and shown in the drawings is adapted to extend athwart ship and to operate double or parallel rudders; but, as will be hereafter explained, it may be modified so as to operate only one rudder, within the spirit and scope of certain of my claims. If desired, the machine may also be positioned longitudinally of the ship.

Said motors are adapted through any suitable transmission means as through gears 4b, 4c, 4d, 4e, to rotate a screw or worm 5 which is right threaded at one end and left threaded at its opposite end, which right threaded end engages a reciprocable cross head 6 adapted to reciprocate upon said screw and upon a parallel support 6a. The left threaded end of said screw engages a reciprocable cross head 7 adapted to reciprocate upon said screw and upon a parallel support 7a.

Said screw and parallel supports are mounted in standards of any suitable construction as 27, 28.

Extending laterally from said crossheads are pairs of brackets 6b, 6c, and 7b, 7c, respectively. Pivotally secured to said brackets 6b, 6c are telescopic tiller connecting arms 8 and 9, respectively, which are pivotally secured at their opposite ends to the opposite ends, respectively, of a tiller 10a, which is mounted upon and adapted to turn a rudder post 10. Pivotally connected at one end to the brackets 7b, 7c are telescopic tiller connecting arms 12 and 13, respectively, which are pivotally secured at their opposite ends to the opposite ends, respectively, of a second tiller 14a, mounted upon and adapted to turn a second rudder post 14.

Each of said tiller connecting arms comprises a sleeve 15 of any suitable structure, secured at one end to the corresponding said bracket and provided with a centrally apertured abutment or washer 15a extending across the bore of said sleeve intermediate of its ends, said sleeve being preferably further provided with a centrally apertured guide partition 15b extending across said bore between said abutment and said bracket-attached end of said sleeve. Said sleeve is preferably constructed in two sections secured together by a coupling, and said abutment is preferably clamped between the sections, and the free end of said sleeve is preferably internally contracted.

Extending or telescoping into the free end of said sleeve is a push rod 16 which is reduced intermediate of its ends to form a shoulder 16a. Upon said push rod is a loose washer 16b adapted to bear against said shoulder. The internal end of said push rod is preferably further reduced and extends through the central aperture in said guide partition. A washer or collar 17 is mounted upon said push rod between said abutment and said guide partition and is secured on said push rod by any suitable means, as by a nut 17a. Mounted upon said push rod at opposite sides of said abutment are springs 19 and 20, respectively, adapted to bear against said abutment and the opposing said washers. Preferably said springs 19 and 20 are under some tension, but are stiff enough to resist any normal pull or thrust on said push rods, but if the rudder receives an abnormal blow or excessive pressure on its side face, it will cause one or another of said push rods to be thrust inwardly in its sleeve and to directly or indirectly transfer the adjacent or corresponding circuit closer from its controller circuit to one of said parallel or detour circuits.

It will be observed that there are four of said circuit closers, each of which is adapted to be operated independently by a different one of said push rods. If desired, either of said rudders and its post, tiller, and the connecting rods pivoted thereto may be omitted and the machine will efficiently operate the remaining rudder. If desired, either one of said engines or motors may be, and preferably is, temporarily disconnected and held in reserve for use in the event that the remaining engine or motor becomes disabled, or in case it becomes desirable to provide greater power in emergencies.

The sections of the sleeves may be secured together and said abutment may be positioned therein in any suitable manner, and it will be observed that my invention may be modified in various other particulars within the spirit and scope of my claims.

What I claim is—

1. In a steering machine, the combination with a rudder, of a source of electricity, a prime mover, master and follow-up controllers and relays adapted independently of said rudder to govern the supply of power to said prime mover; normally open electric circuits excluding said controllers and including said relays, respectively, and including circuit closers common to said controller circuits; means for transmitting motion from said prime mover to said rudder and including means governed by said rudder for transferring said circuit closers from the controller circuits to said controller excluding circuits when said rudder is subjected to an excessively violent side blow.

2. The combination with a relatively remote object to be moved, electric circuits comprising a source of electricity; a prime mover; master and follow-up controllers and relays adapted independently of said object to govern the admission of power to said prime mover; normally open electric circuits excluding said controllers and including said relays, respectively, and including circuit closers common to said controller circuits; means for transmitting motion from said prime mover to said object and including means governed by said object for transferring one of said circuit closers to one of said controller excluding circuits when said object is subjected to an excessive pressure.

3. The combination with a prime mover, of a normally open electric circuit comprising a source of electricity, master and follow-up controllers and a relay adapted in operation to govern the operation of said prime mover; a second normally open circuit excluding said controllers and including said relay and a circuit closer common to said controller circuit; and means for transferring said circuit closer from said controller circuit to said controller excluding circuit.

4. In a steering machine, the combination of a master controller, a follow-up controller, a prime mover governed by said follow-up, a normally closed switch in circuit with said follow-up, a worm, a reciprocable cross head adapted to be reciprocated by said worm, transmission means adapted to be driven by said prime mover and to drive said worm, a rudder post, a tiller on said post, a telescopic connecting arm pivotally connected at one end to said tiller and at its opposite end to said crosshead, resilient means for preventing material longitudinal movement of the members of said arm with respect to each other under normal strains, one member of said arm being adapted to effect the opening of said switch when said rudder receives an excessive blow against one of its side faces, and means for automatically closing said switch when the opening service thereto of said arm member has been suspended.

5. The combination of a master controller, a follow-up controller, a prime mover governed by said follow-up, normally closed switches in circuit with said follow-up, a worm, a pair of crossheads adapted to be reciprocated in opposite directions simultaneously by said worm, transmission means adapted to be driven by said prime mover and to drive said worm, a rudder post, a rudder tiller on said post, a pair of expansible and contractible connecting arms pivotally connected at one end to said crossheads respectively, and at their opposite ends to the opposite ends of said tiller respectively, each of said arms being provided with resilient means for preventing material longitudinal movement of its members with respect to each other under normal strains, one member of one of said arms being adapted to open one of said switches when said rudder receives an excessively violent blow upon one side face, one member of the other of said arms being adapted to open the other of said switches when the rudder receives an excessively violent blow on its opposite side face, and means for automatically closing said switches when the closing services thereto of said members has been temporarily suspended.

6. The combination of a master controller, a follow-up controller, a prime mover governed by said follow-up controller, four switches in circuit with said follow-up, a worm, a pair of cross heads on said worm, transmission means adapted to be driven by said prime mover and to drive said worm, a pair of posts spaced from each other, a tiller on each of said posts, a telescopic connecting arm pivotally secured at one end to one of said cross heads and at its opposite end to one end of one of said tillers, a second telescopic connecting arm pivotally secured at one end to the other of said crossheads and at its opposite end to the other end of the said tiller, a third telescopic connecting arm pivotally secured at one end to the first said cross head and at its opposite end to one end of the first said tiller, a fourth telescopic connecting arm pivotally secured at one end to the second said crosshead and at its opposite end to the other end of the second said tiller, each of said connecting arms being provided with resilient means for preventing material longitudinal movement of its members with respect to each other under normal strains, one member of each of said arms being adapted to open a different one of said four switches when the arm is subjected to excessively violent telescoping pressure.

7. The combination of a post, a tiller on said post, a reciprocable block, means for reciprocating said block, a telescopic connecting arm pivotally secured at one end to said block and pivotally secured at its opposite end to said tiller, said arm being provided with yielding means for preventing longitudinal movement of the members of said arm with respect to each other under normal strains.

8. The combination of a post, a tiller mounted on said post and adapted to turn the same, a pair of reciprocable blocks, means for reciprocating said blocks in opposite directions simultaneously, a telescopic connecting arm pivotally connected at one end to one of said blocks and at its opposite end to one end of said tiller, a second telescopic connecting rod arm pivotally connected at one end to the other of said blocks and at its opposite end to the other end of said tiller, one of said arms being provided with yielding means for preventing the longitudinal movement of the members of said arm with respect to each other under normal strains.

9. The combination of a post, a tiller on said post and adapted to turn the same, a reciprocable block, means for reciprocating said block, an expansible and contractible connecting arm pivotally connected at one end to said block and at its opposite end to said tiller; a second post, a tiller on said second post and adapted to turn the same, a second expansible and contractible connecting arm pivotally secured at one end to said block and at its opposite end to the tiller on said second post, each of said connecting arms being provided with yielding means for preventing its expansion or contraction under normal strains.

10. The combination of a post, a tiller on said post adapted to turn the same, a pair of reciprocable blocks, means for reciprocating said blocks in opposite directions simultaneously, expansible and contractible connecting means pivotally secured at one end to one of said blocks and at its opposite end to said tiller, a second post, a tiller on said second post and adapted to turn the same, expansible and contractible connecting means pivotally secured at one end to the other of said blocks and at its opposite end to the other of said tillers, said connecting means being provided with yielding means for preventing their expansion or contraction under normal strains.

11. In a steering machine, a tiller connecting arm comprising a sleeve provided with a stationary abutment intermediate of its ends, a rod extending into said sleeve, the major portion of said rod within said sleeve being reduced and extending through said abutment, said rod being provided with a collar near its inward end, resilient means adapted to bear at one end against said abutment and at its opposite end against said collar, and resilient means interposed between said abutment and the enlarged outward-extending end of said rod.

12. The combination of a normally open electric circuit comprising a source of electricity, a normally open switch and a relay; a rudder, and means including telescopic elements adapted to be actuated by said rudder to close said switch when said rubber is subjected to an excessively violent side blow.

13. The combination of a plural number of normally open electric circuits, each comprising a source of electricity, a normally open switch and a relay, a rudder, means adapted to be operated by said rudder to close one of said switches when said rudder receives an excessively violent side blow on one of its side faces, and means adapted to be operated by said rudder to close a different one of said switches when said rudder receives an excessively violent side blow on its opposite side face.

14. The combination of a plural number of normally open electric circuits, each comprising a source of electricity, a normally open switch and a relay; a rudder; means adapted to be operated by said rudder for closing one of said switches when said rudder is subjected to excessive pressure against one of its side faces, means adapted to be operated by said rudder to close a different one of said switches when said rudder is subjected to excessive pressure against its opposite side face, and means partly in common with said circuits and switch closing means for operating said rudder under normal pressures upon either of its side faces.

15. The combination of a source of energy; a prime mover; an object to be moved; means for delivering such energy to said prime mover; means for arbitrarily controlling such delivery, said controlling means including removable and replaceable portions; means for transmitting motion from said prime mover to said object; means including telescopic elements for automatically controlling the delivery of such energy to said prime mover, said automatic means being partly common to said transmitting means and adapted to remove said removable and replaceable portions of the arbitrary controller and including said portions when removed and including said object to be moved, said automatic means being adapted to be actuated by operating forces accidentally applied to said object to be moved other than through the normal operation of said prime mover.

In testimony whereof, I hereunto affix my signature.

ALMON A. JOHNSON.